United States Patent [19]

Kuwahara et al.

[11] Patent Number: 4,713,700
[45] Date of Patent: Dec. 15, 1987

[54] A RECORDING CIRCUIT HAVING MEANS TO AUTOMATICALLY SET THE RECORDING CURRENT OF A MAGNETIC RECORDING HEAD

[75] Inventors: Kazuyoshi Kuwahara; Isao Fukushima, both of Katsuta; Kuniaki Miura, Ibaraki; Kenji Kano, Mito, all of Japan

[73] Assignee: Hitachi, Ltd., Tokyo, Japan

[21] Appl. No.: 752,859

[22] Filed: Jul. 8, 1985

[30] Foreign Application Priority Data

Jul. 10, 1984 [JP] Japan ................................. 59-141326
Jul. 20, 1984 [JP] Japan ................................. 59-149481

[51] Int. Cl.$^4$ ...................... H04N 5/782; H04N 9/79; G11B 5/45
[52] U.S. Cl. ...................................... 358/315; 360/66; 360/68
[58] Field of Search .................. 358/315, 310; 360/66, 360/67, 68

[56] References Cited

U.S. PATENT DOCUMENTS

| 4,353,100 | 10/1982 | Inoue | 360/66 X |
| 4,438,466 | 3/1984 | Fawkes et al. | 360/66 |
| 4,454,548 | 6/1984 | Jensen | 360/66 |
| 4,533,961 | 8/1985 | Shibata et al. | 358/315 |
| 4,616,273 | 10/1986 | Ishii et al. | 360/66 |

Primary Examiner—Robert L. Richardson
Attorney, Agent, or Firm—Antonelli, Terry & Wands

[57] ABSTRACT

In a magnetic recording circuit with a bias current circuit adapted to superimpose a bias current from a bias oscillator on a recording signal and to supply a resultant signal to a magnetic head, there is provided a resistor for detecting the bias current flowing through the magnetic head, a rectifier circuit for rectifying and smoothing a signal developing across the resistor, and a control circuit for comparing the output voltage of the rectifier circuit with a reference voltage and producing an output signal which controls the oscillation level of the bias oscillator, whereby the bias current flowing through the magnetic head can automatically be set to a predetermined level. A variable resistor for adjustment of the bias current and adjustment step for the variable resistor can be dispensed with.

15 Claims, 12 Drawing Figures

A RECORDING CIRCUIT HAVING MEANS TO AUTOMATICALLY SET THE RECORDING CURRENT OF A MAGNETIC RECORDING HEAD

BACKGROUND OF THE INVENTION

The present invention relates to a recording circuit in a magnetic recording and reproducing apparatus and more particularly to a magnetic recording circuit suitable for use as a recording circuit for video signals in a video tape recorder (VTR) of, for example, a helical scan type, a recording circuit of a voice FM recording and reproducing apparatus or a bias current circuit for controlling a bias current supplied to a recording head of a tape recorder.

A magnetic recording and reproducing apparatus such as a VTR or a tape recorder has in its recording circuit for voice signals a bias current circuit. To record a voice signal, the voice signal is superimposed on a bias current in order that upon reproduction of the voice signal, waveform distortions can be suppressed. However, where the bias current supplied to a magnetic head does not have a proper value, the reproduced voice signal will be degraded in its frequency characteristics, decreased in its level and accompanied by an increased waveform distortion. To cope with this problem, it is a practice to provide in the bias current circuit a variable resistor for adjustment of the level of the bias current. In mass production of magnetic recording and reproducing apparatus, level adjustment for the variable resistors is very time-consuming and troublesome. In addition, for ease of the adjustment, layout of the variable resistors must be taken into consideration and the degree of freedom of design is impaired.

SUMMARY OF THE INVENTION

An object of this invention is to provide a magnetic recording circuit which can automatically set current signals passed through a magnetic head to a predetermined level without resort to a variable resistor for adjustment of level of the current signals.

To accomplish the above object, according to an aspect of this invention, there is provided a magnetic recording apparatus for recording information on a recording medium through a magnetic head having a predetermined recording characteristic, comprising recording signal processing means receiving an input signal representative of information to be recorded, for processing the received input signal so as to generate a recording signal of a given level to be supplied to the magnetic head: means for detecting the recording signal passed through the magnetic head; control signal generation means, responsive to the detected recording signal, for generating a control signal adapted for setting the level of the recording signal passed through the magnetic head to a predetermined level; and control means, responsive to the control signal, for controlling the recording signal processing means so as to set the recording signal passed through the magnetic head to the predetermined set level.

DESCRIPTION OF THE PREFERRED EMBODIMENTS

Prior to describing the invention by way of example with reference to the accompanying drawings, a conventional magnetic recording apparatus will first be described by referring to FIGS. 1 to 4, for better understanding of the invention.

Figure 1:
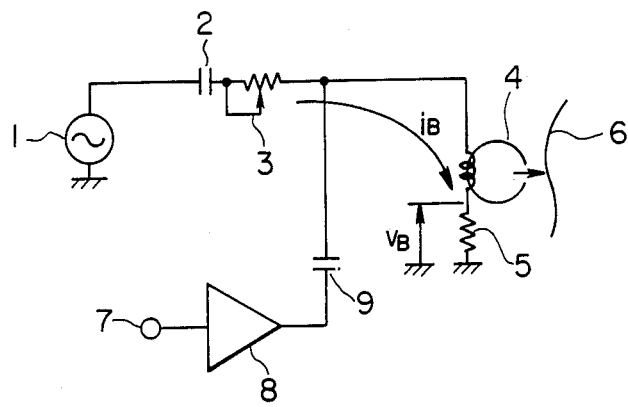
FIG. 1 is a circuit diagram showing an example of a conventional (prior art) bias current circuit.

A conventional bias current circuit for use in a tape recorder as examplified in FIG. 1 comprises a bias oscillator 1, capacitors 2 and 9, a variable resistor 3, a resistor 5, an input terminal 7, and an amplifier 8. A magnetic head 4 associated with a magnetic tape 6 is connected between the variable resistor 3 and the resistor 5.

In FIG. 1, a bias signal generated from the bias oscillator 1 is passed through the DC blocking capacitor 2 and converted into a bias current $i_B$ of a value determined by a resistance of the variable resistor 3. The bias current $i_B$ is drawn to a ground terminal via a winding of the magnetic head 4 and the resistor 5.

A voice signal, on the other hand, is applied to the input terminal 7 and fed to the amplifier 8 at which it is amplified to a predetermined level and given a desired frequency characteristic for the purpose of amplitude and phase equalization and high-frequency band correction and the like. An output voice signal delivered out of the amplifier 8 is passed through the DC blocking capacitor 9 so as to be superimposed on the bias current $i_B$ and recorded on the magnetic tape 6 by means of the magnetic head 4.

The bias current circuit of the above construction which is based on AC bias recording can minimize waveform distortions accompanying recording signals and therefore, it has been used in many applications.

Figure 2:
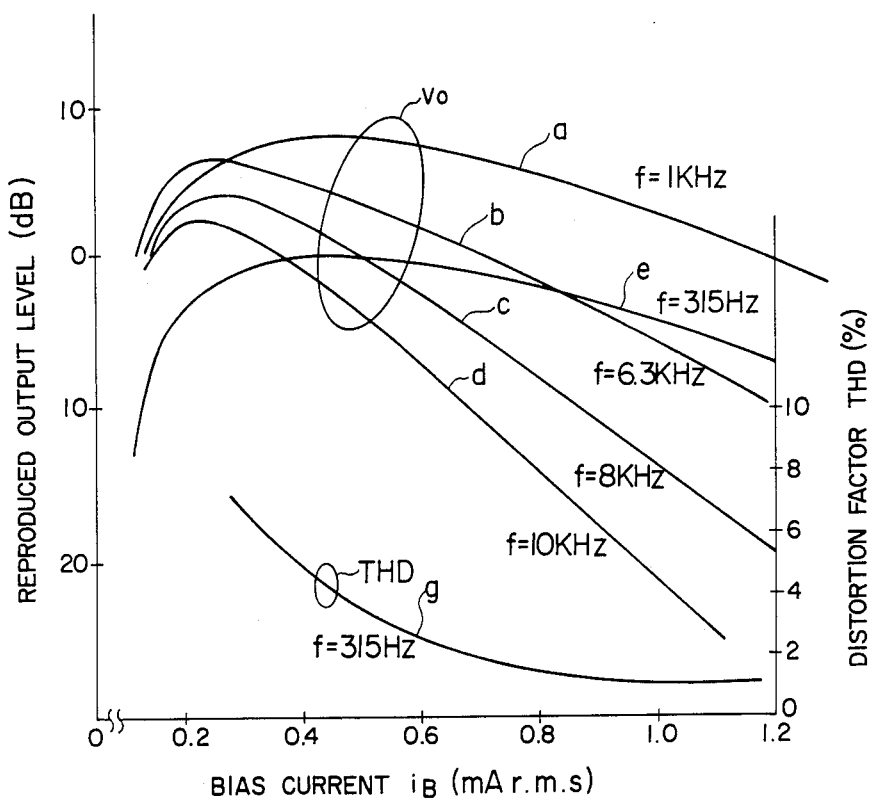
FIG. 2 is a graph showing bias characteristics of a magnetic head.

FIG. 2 graphically shows bias characteristics for a magnetic head of a tape recorder.

In FIG. 2, the abscissa represents bias current, the lefthand ordinate represents reproduced output level and the righthand ordinate represents a distortion factor. For recording signals at various predetermined frequencies, changes in the reproduced output level are plotted with respect to changes in the bias current to provide characteristic curves a to e, and for a recording signal at a predetermined frequency, changes in the distortion factor with respect to changes in the bias current are plotted to provide a characteristic curve g.

As will be seen from FIG. 2, for improper values of the bias current, the reproduced output level changes to a large extent, and frequency characteristics and distortion factor characteristics are degraded.

The bias current deviates from an optimum value due to the fact that the level of the bias signal outputted from the bias oscillator 1 fluctuates and the impedance of one magnetic head is slightly different from that of another magnetic head.

Conventionally, a voltage drop $v_B$ across the resistor 5 shown in FIG. 1 is therefore measured to detect an amount of bias current, and the variable resistor 3 is then set through manual adjustment to a value which makes the voltage drop $v_B$ developing across the resistor 5 correspond to the optimum value of the bias current.

An example resembling the conventional bias current circuit shown in FIG. 1 is disclosed in "Tape Recorder" by Okiaki Tsuno, Nikkan Kohgyo Shimbun-sha, pp 71-72, April, 1971.

A video signal, magnetic recording circuit of a VTR will now be described.

Figure 3:
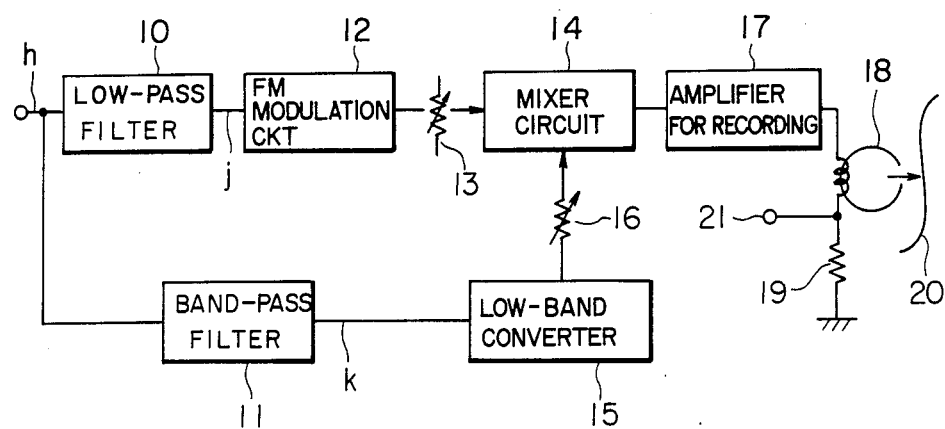
FIG. 3 is a block diagram showing a video signal recording circuit of a conventional (prior art) VTR for home use.

FIG. 3 shows a conventional video signal, magnetic recording circuit for use in a VTR for home use of, for example, VHS type. In FIG. 3, a video signal h is separated into a luminance signal j and a chroma signal k by means of a low-pass filter 10 (hereinafter simply referred to as LPF) and a band-pass filter 11 (hereinafter simply referred to as BPF). The luminance signal j is FM-modulated by an FM modulator circuit 12 and thereafter fed to a mixer circuit 14 via a level adjuster 13. The chroma signal k is subjected to a low-band conversion by a low-band conversion circuit 15 and then fed to the mixer circuit 14 via a level adjuster 16. These signals are mixed together at the mixer circuit 14 and then passed to a resistor 19 which is grounded via an amplifier circuit 17 for recording and a magnetic head 18 by way of which a resultant mixed signal is recorded on a magnetic tape 20. The level adjusters 13 and 16 are monitored for level adjustment by using a signal delivered out of an output terminal 21.

Figure 4:
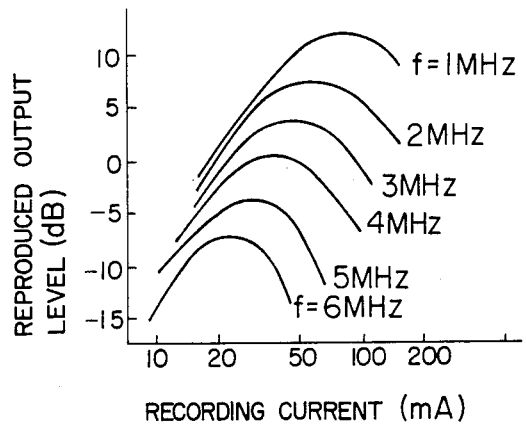
FIG. 4 is a graph showing recording current versus reproduction output characteristics of the VTR magnetic head with frequencies used as parameters.

FIG. 4 shows graphically a specific example of recording current characteristics which is described in "VTR" by Kenichi Sawazaki, Corona-sha, p 49, FIG. 4.12, October, 1971. In FIG. 4, the abscissa represents recording current passed through the magnetic head 18 and ordinate represents reproduced output level. It will be seen from FIG. 4 that changes in the recording current has an effect upon level and frequency characteristics of the reproduced output signal. Accordingly, a deviation of the recording current from an optimum value results in a degraded signal to noise ratio of a picture reproduced by the VTR.

To cope with this problem, in the VTR for home use, the recording current in the magnetic head 18 is adjusted by the level adjusters 13 and 16 so as to absorb fluctuations in the recording current due to variations in the impedance of magnetic head 18 and the circuit gain.

To this end, for the luminance signal j, the level adjuster 13 is so adjusted manually as to make a voltage drop across the resistor 19 developing at the output terminal 21 correspond to an optimum value for a magnetic head used, and for the chroma signal k, the level adjuster 16 is manually adjusted such that the recording current exclusive of the luminance signal, which results in a flow of only chroma signal drawn into the magnetic head, is usually lower than the level of the recording current, including only the luminance signal, by about 10 dB by which occurrence of cross-beat interference between the chroma and luminance signals can be avoided.

In the VTR, the recording current must be adjusted manually with respect to both the luminance signal and the chroma signal and this troublesome adjustment can be effectuated only by using the variable resistors, which are costly.

An example of a circuit configuration similar to the above recording current adjustment circuit is disclosed in "Compact VTR" by Masakazu Hara and Saburo Takahashi, Nippon Hoso Shuppan Kyokai, p 93, March, 1972.

The invention will now be described by way of example with reference to the drawings. In the following description, identical elements to those of FIGS. 1 and 3 are designated by identical reference numerals and will not be detailed.

Figure 5:
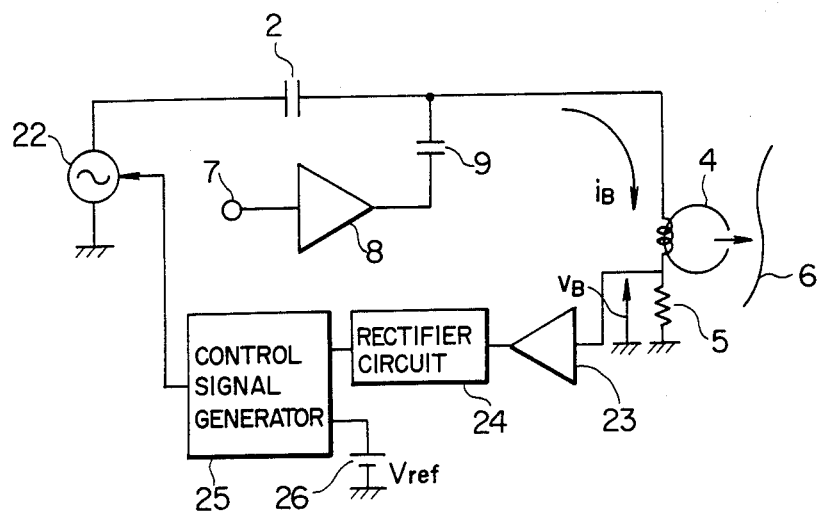
FIG. 5 is a block diagram of a magnetic recording circuit for a voice signal according to an embodiment of the invention.

FIG. 5 shows an embodiment in which the invention is applied to a voice signal, magnetic recording apparatus such as a VTR or tape recorder. In FIG. 5, a bias oscillator 22 whose oscillation magnitude is controllable is connected to a magnetic head 4 via a DC blocking capacitor 2. The magnetic head 4 is grounded via a resistor 5. A voice signal to be recorded, on the other hand, is supplied to an input terminal 7 and fed to an amplifier 8 at which it is amplified to a predetermined level and given a necessary frequency characteristic. An amplified voice signal delivered out of the amplifier 8 is passed through a DC blocking capacitor 9 and superimposed on a bias current $i_B$. A resultant signal is recorded on a magnetic tape 6 by means of the magnetic head 4. The capacitors 2 and 9 have ends connected in common to the magnetic head and function to mix the voice signal and bias current. The amplifier 8, capacitors 2 and 9 and bias oscillator 22 constitute a voice signal processing circuit which converts the voice signal supplied to the input terminal 7 into a recording signal suitable for application to the magnetic head 4.

An amplifier 23 has an input terminal connected to a junction between the resistor 5 and the magnetic head and an output terminal connected to an input terminal of a rectifier circuit 24. The rectifier circuit 24 has an output terminal connected to one input terminal of a control signal generator circuit 25, and a reference voltage source 26 of a voltage level $V_{ref}$ is connected between the other input terminal of the control signal generator circuit 25 and ground. The control signal generator circuit 25 has an output terminal connected to a control input terminal of the bias oscillator 22.

In operation, a voltage $v_B$ developing across the resistor 5 in proportion to the bias current $i_B$ is amplified by the amplifier 23 to an appropriate level, and rectified and smoothed by the rectifier circuit 24 so as to be converted into a DC voltage signal which in turn is supplied to the one input terminal of the control signal generator circuit 25.

The control signal generator 25 detects a difference between a level of the DC voltage signal and the preset voltage level $V_{ref}$ of the reference voltage source 26 and supplies to the control input terminal of the bias oscillator 22 a control signal adapted to cancel out the voltage level difference.

Thus, the output signal level of the bias oscillator 22 is controlled by the control signal so as to set the bias current $i_B$ to a predetermined optimum value designated by the reference voltage source 26.

Since the predetermined optimum bias current $i_B$ can be set automatically in this manner, the adjustment step for the bias current conventionally required in the production line of magnetic recording and reproducing apparatus can be dispensed with and it does away with the conventional design which necessarily takes into consideration the layout of the adjustable parts, thereby improving the degree of freedom of design.

Figure 6:
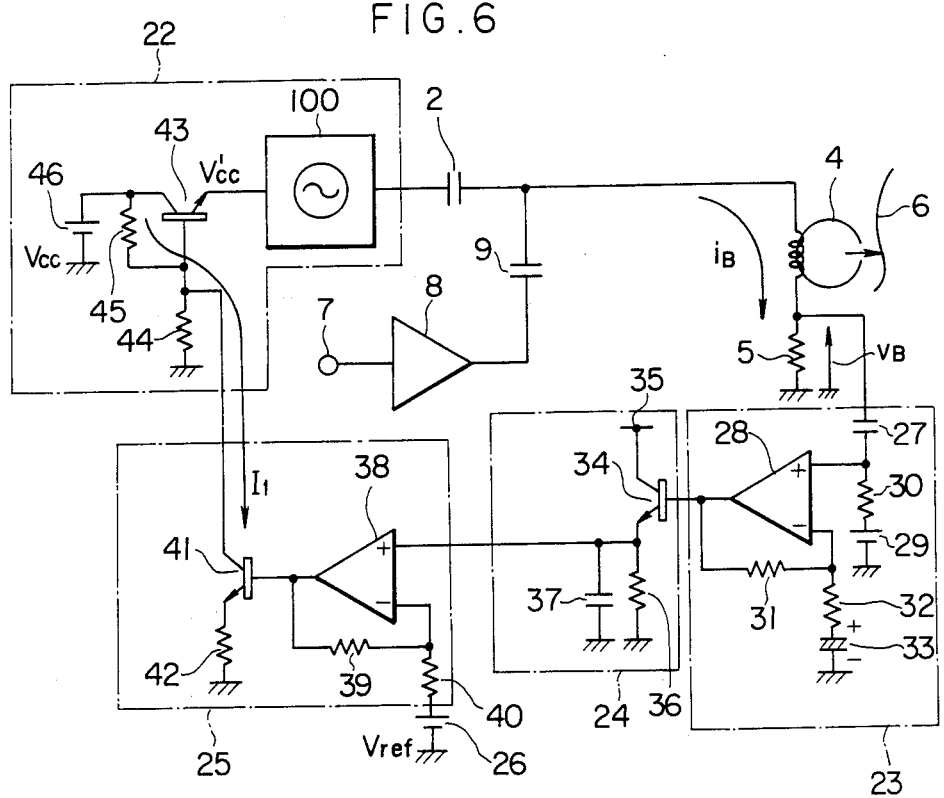
FIG. 6 is a circuit diagram of a circuit arrangement for implementation of the FIG. 5 embodiment.

The FIG. 5 magnetic recording circuit can be exemplarily implemented as shown in FIG. 6.

Referring to FIG. 6, a circuit corrresponding to the amplifier circuit 23 shown in FIG. 5 comprises capacitors 27 and 33, an amplifier 28, resistors 30, 31 and 32, and a voltage source 29.

A circuit corresponding to the rectifier circuit 24 shown in FIG. 5 comprises an NPN type transistor 34, a resistor 36, and a capacitor 37.

A circuit corresponding to the FIG. 5 control signal generator circuit 25 comprises an amplifier 38, resistors 39, 40 and 42, and a transistor 41.

A circuit corresponding to the FIG. 5 bias oscillator 22 comprises resistors 44 and 45, an NPN transistor 43, a voltage source 46 and an oscillator 100.

A junction between the resistor 5 and the magnetic head 4 is connected to a non-inverting input terminal of the amplifier 28 via the DC blocking capacitor 27, and a voltage $v_B$ which results from the bias current $i_B$ superimposed with the voice signal and which develops across the resistor 5 is supplied to the non-inverting input terminal of the amplifier 28 via the DC blocking capacitor 27. The non-inverting input terminal is also connected to the voltage source 29 via the resistor 30. A DC voltage of this voltage source 29 causes the central level of the voltage $v_B$ to shift to a given level which lies within a range of input voltages, over which the amplifier 28 is operable. The amplifier 28 has a gain determined by the resistors 31 and 32 and DC full feedback capacitor 33. The capacitor 33 also acts to prevent the DC voltage of the voltage source 29 from being amplified by the amplifier 28.

An output terminal of the amplifier 28 is connected to a base of the transistor 34 and the voltage $v_B$, now amplified to a predetermined level by the amplifier 28, is supplied to the transistor 34.

The transistor 34 has its collector connected to a power supply 35 and its emitter connected to a parallel connection of the resistor 36 and capacitor 37, thereby completing an emitter follower detector circuit. A signal fed from the amplifier 28 is rectified by this circuit and led to a non-inverting input terminal of the amplifier 38. By setting a time constant of the resistor 36 and capacitor 37 to be sufficiently greater than an oscillation period of the oscillator 100, a smoothed DC voltage having a level corresponding to a peak value of the amplified voltage $v_B$ can be obtained.

The amplifier 38 is connected with the resistors 39 and 40 for gain setting and is also connected, at its inverting input terminal, to the reference voltage source 26 via the resistor 40. An output terminal of the differential amplifier 38 is connected to a base of the transistor 41. A difference between the level of the signal applied to the non-inverting input terminal and the voltage $V_{ref}$ of the reference voltage source 26 is detected, and the difference is amplified to a predetermined level and then supplied to the transistor 41.

The transistor 41 has its emitter grounded via the resistor 42 and its collector connected to a base of the transistor 43.

The base of the transistor 43 is grounded via the resistor 44 and is connected via the resistor 45 to a collector of the transistor 43 and to the voltage source 46.

The transistor 41 is responsive to a level of the voltage signal fed from the amplifier 38 to the control base voltage of the transistor 43.

Assuming that the collector current of the transistor 41 is $I_1$, the voltage of the voltage source 46 is $V_{cc}$, the emitter voltage of the transistor 43 is $V'_{cc}$, the resistance of the resistor 45 is R, and forward base-emitter voltage is $V_F$, there results $$V'_{cc} = V_{cc} - (I_1 \cdot R + V_F) \tag{1}$$

The emitter voltage $V'_{cc}$ is used as a power supply voltage for feeding the bias oscillator 100 so that the output signal level of the bias oscillator 100 is variable in proportion to this emitter voltage $V'_{cc}$.

When the impedance of the magnetic head 4 used is larger than a stipulated value by an amount according to which the bias current $i_B$ is decreased, the voltage $v_B$ developing across the resistor 5 falls below a predetermined value. As a result, the signal level supplied to the differential amplifier 38 becomes lower than the voltage $V_{ref}$ of the reference voltage source 26 to thereby decrease the collector current of the transistor 41. It follows therefore, pursuant to equation (1), that the voltage drop across the resistor 45 is decreased to raise the emitter voltage $V'_{cc}$ and the resulting output signal level of the bias oscillator 100. Consequently, the bias current $i_B$ can be maintained at an optimum value designated by the reference voltage source 26.

Conversely, when a magnetic head 4 having a small impedance is used, the bias current $i_B$ increases and consequently the voltage $v_B$ developing across the resistor 5 increases, with the result that a higher voltage than the voltage $V_{ref}$ of the reference voltage source 26 is supplied to the differential amplifier 38. As a result, the output signal level of the differential amplifier 38 increases, followed by an increase in the collector current $I_1$ of the transistor 41. It follows therefore pursuant to the above equation (1) that the power supply voltage or emitter voltage $V'_{cc}$ decreases to reduce the output signal level of the bias oscillator 100, thereby maintaining the bias current $i_B$ at the predetermined value.

Figure 7:
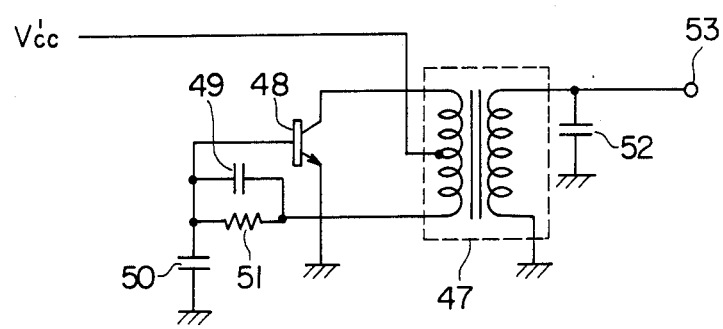
FIG. 7 is a circuit diagram of a circuit arrangement for implementation of a bias oscillator shown in FIG. 6.

FIG. 7 is a circuit diagram showing an example of the oscillator 100 of FIG. 6. The emitter voltage $V'_{cc}$ is led to a center tap of a primary winding of a bias transformer 47. One end of the primary winding of the bias transformer 47 is connected to a collector of a transistor 48. The transistor 48 has its emitter grounded and its base connected to one end of each of the capacitors 49 and 50 and a resistor 51. The other end of the capacitor 50 is grounded, and the other end of each of the capacitor 49 and resistor 51 is connected to the other end of the primary winding of the bias transformer 47.

The bias transformer 47 has a secondary winding of which one end is grounded and the other end is connected to one end of a capacitor 52 and to an output terminal 53. The other end of the capacitor 52 is grounded. The oscillation output appears at the output terminal 53. The resistor 51 acts as a base bias resistor for the transistor 48, the capacitors 49 and 50 determine the amount of AC signal feedback to the base of the transistor 48, and the capacitor 52 cooperates with an inductance of the secondary winding of the bias transformer 47 to determine the oscillation frequency. The oscillator 100 constructed as above generates an oscillation output whose level is controlled by the emitter voltage $V'_{cc}$.

The oscillator 100 is in no way limited to the oscillator shown in FIG. 7 but it may obviously be any types of oscillator whose output is controllable.

As described above, since, according to this embodiment, feedback control is effected so as to maintain the bias current at the optimum value, the manual adjustment of the bias current can completely be dispensed with and it suffices in design of magnetic recording and reproducing apparatus to do away with consideration of the layout of the bias current adjusting means, thereby improving the degree of freedom of design. For these reasons, a magnetic recording circuit for a voice signal with a bias current circuit can be provided which can eliminate the drawbacks of the conventional technique and perform excellently.

Figure 8:
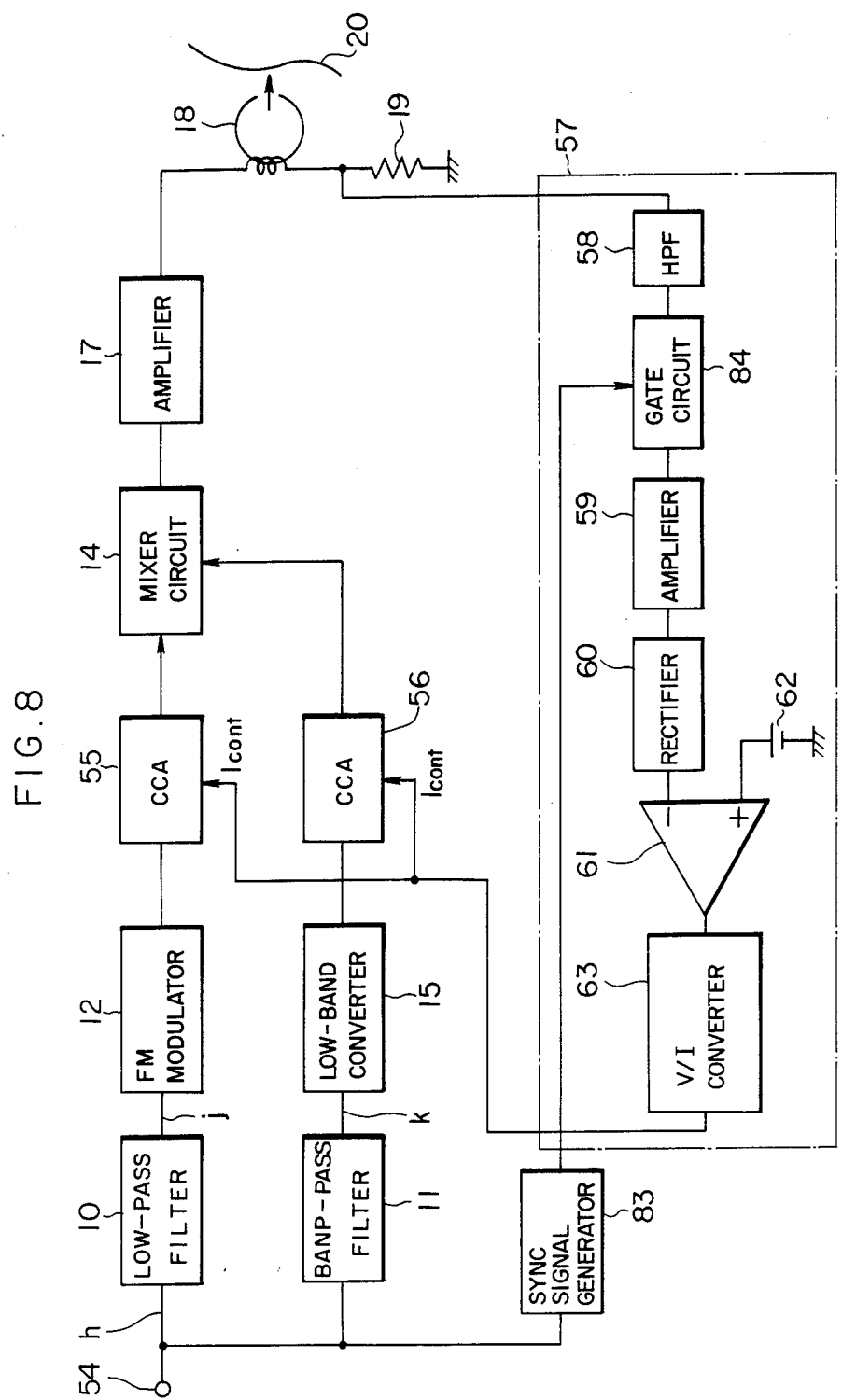
FIG. 8 is a block diagram of a magnetic recording apparatus for a voice signal according to an embodiment of the invention.

FIG. 8 shows an embodiment in which the invention is applied to a video signal, magnetic recording apparatus.

In FIG. 8, identical elements to those of FIG. 3 are designated by identical reference numerals and will not be detailed herein.

Referring to FIG. 8, an input terminal 54 is for reception of a video signal h, and the LPF 10, BPF 11, FM modulator circuit 12, low-band conversion circuit 15, mixer circuit 14 and recording amplifier circuit 17 constitute a recording signal processing section. A current controlled type amplifier circuit (hereinafter simply referred to as a CCA circuit) 55 is inserted between the FM modulator circuit 12 for FM modulation of a luminance signal j and the mixer circuit 14. Similarly, a CCA circuit 56 is inserted between the low-band conversion circuit 15 for low-band conversion of a chroma signal k and the mixer circuit 14. The CCA circuits control the recording signal processing section so as to adjust the levels of the luminance signal and chroma signal. As will be detailed later, these CCA circuits operate to respond to changes in a control signal $I_{cont}$ so as to change the levels of the luminance signal and the chroma signal based on the fact that the control signal $I_{cont}$ is related to an input/output gain G of the CCA circuit by $I_{cont} \alpha G$. A voltage signal representative of a recording current developing across the resistor 19 is, on the other hand, inputted to a recording signal control section 57 depicted by the broken line, and an output signal of this section 57 is supplied as the control signal $I_{cont}$ to the CCA circuits 55 and 56. In the recording signal control section 57, the voltage signal detected from the resistor 19 is first applied to a high-pass filter (hereinafter simply referred to as HPF) 58 which passes only a signal indicative of a luminance signal component contained in the recording current flowing through the magnetic head 18, and the luminance component signal is fed to a gate circuit 84 which extracts from the luminance component signal a sync signal component. To this end, the gate circuit 84 is controlled by receiving an output of a sync signal separation circuit 83 which detects a sync signal from the video signal h. An output voltage of the gate circuit 84 is amplified by an amplifier circuit 59, rectified by a rectifier circuit 60 and then inputted to a comparator 61. The comparator 61 is also inputted with a reference voltage from a reference voltage source 62 for determination of a desired recording current, and a rectified voltage is compared with the reference voltage at the comparator 61. A resulting difference voltage is amplified by the comparator 61 and applied to a voltage-to-current converter (or simply referred to as V/I circuit) 63. Thus, an output current of the control section 57, which has been converted from the output voltage of the comparator 61 into a current corresponding to the output voltage value by the voltage-to-current converter 63, is supplied as a control signal $I_{cont}$ to the CCA circuits 55 and 56 to control the levels of the luminance signal and the chroma signal such that the recording signal flowing through the magnetic head 18 is constantly controlled to a desired value.

Figure 9:
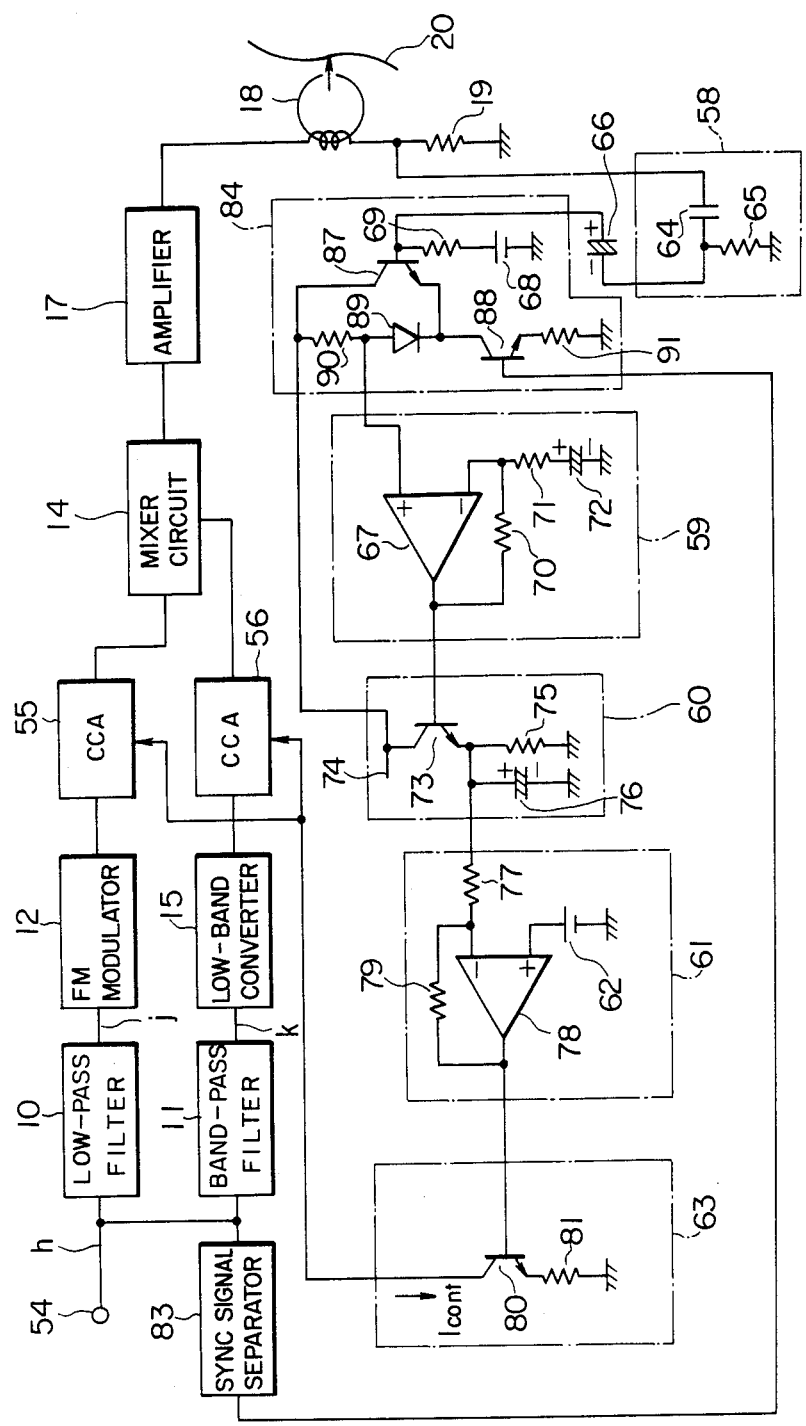
FIG. 9 is a circuit diagram showing a partial circuit arrangement for implementation of the magnetic recording apparatus shown in FIG. 8.

An example of the control section 57 is illustrated in a circuit diagram of FIG. 9 in which elements other than the control section are illustrated in block form. A recording current flowing through the magnetic head 18 causes a voltage drop across the resistor 19 and a voltage representative of the recording current is applied to one end of a capacitor 64.

The other end of the capacitor 64 is grounded via a resistor 65. The capacitor 64 and the resistor 65 constitute the HPF 58. The voltage is then supplied to a base of a transistor 87 via a DC blocking capacitor 66.

The base of the transistor 87 is fed with a DC bias voltage from a bias voltage source 68 via a resistor 69. The transistor 87 has its collector connected to a power supply 74 and its emitter connected to a collector of a transistor 88 and to a cathode of a diode 89. An anode of the diode 89 is connected to one end of a resistor 90 and a non-inverting input terminal of an amplifier 67. The other end of the resistor 90 is connected to the power supply 74. The transistor 88 cooperates with its emitter resistor 91 to constitute a constant current circuit as will be described later. This transistor 88 has its base controlled by the output of the sync signal separation circuit 83. The gate circuit 84 transmits the output of the HPF 58 to the succeeding stage of amplifier circuit 59 when the output of the sync signal separation circuit 83 is present but does not do so when the output of the sync signal separation circuit is grounded. The output of the sync signal separation circuit 83 is a sync signal extracted from the video signal h, and the gate circuit 84 is controlled by this sync signal so that only the sync signal contained in the luminance signal component of the recording current flowing through the magnetic head 18 can be derived.

The sync signal separated from the video signal h by means of the sync signal separation circuit 83 is a signal of a constant voltage. Therefore, the emitter voltage of the transistor 88 is a constant voltage which is lower than the constant voltage the sync signal by a base-emitter voltage $V_{BE}$ of the transistor 88. Emitter current of the transistor 88 is then obtained by dividing the emitter voltage by a resistance of the resistor 91 and it becomes a constant current value, providing a constant collector current. Accordingly, the transistor 88 and resistor 91 constitute the constant current circuit as mentioned previously. To further detail the operation of the gate circuit 84, when the transistor 88 is turned on by the sync signal, the diode 89 is also turned on and its anode potential becomes substantially equal to a base potential of the transistor 87, with the result that a level of the sync signal detected by the resistor 19 is transmitted to a non-inverting input terminal the succeeding stage amplifier 67 which is connected to the anode of the diode 89.

In the amplifier circuit 59, an output terminal of the amplifier 67 is connected via a resistor 70 to an inverting input terminal, and a resistor 71 and a DC full feedback capacitor 72 are connected between the inverting input terminal and ground. With this construction, the closed circuit gain of the amplifier 67, i.e., the gain of the amplifier circuit 59 is determined by the resistors 70 and 71.

The output terminal of the amplifier 67 is connected to a base of a transistor 73. The transistor 73 has its collector connected to the power supply 74 and its emitter connected to resistors 75 and 77 and a capacitor 76. The transistor 73, resistor 75 and capacitor 76 constitute an emitter follower detector circuit which rectifies and smoothes the output voltage of the amplifier 67 to provide a DC voltage.

The other end of the resistor 77 is connected to an inverting input terminal of an amplifier 78 and to one end of a resistor 79. The other end of the resistor 79 is connected to an output terminal of the amplifier 78. A non-inverting input terminal of the amplifier 78 is supplied from a reference voltage source 62 with a reference voltage which corresponds to the desired value of the recording current flowing through the magnetic head 18. A difference voltage between an emitter voltage of the transistor 73 and the reference voltage is amplified in accordance with a gain determined by the resistors 77 and 79 to provide an output voltage of the amplifier 78. The output voltage of the amplifier 78 is decreased when the emitter voltage of the transistor 73 exceeds the reference voltage and is increased when the emitter voltage is below the reference voltage.

An output terminal of the amplifier 78 is connected to a base of a transistor 80. The transistor 80 has its emitter grounded via a resistor 81 and its collector connected to the CCA circuits 55 and 56. An output voltage of the amplifier 78 is converted into a control current $I_{cont}$ in accordance with an emitter voltage of the transistor 80 and a resistance of the resistor 81. The control signal $I_{cont}$ changes the gain of the CCA circuits 55 and 56 to thereby change the levels of the luminance signal and the chroma signal.

The amplifier circuit 59, rectifier circuit 60, comparator 60 and V/I circuit (voltage-to-circuit converter) 63 described above have essentially the same construction as that of the amplifier circuit 23, rectifier circuit 24 and control circuit 25.

Figure 10:
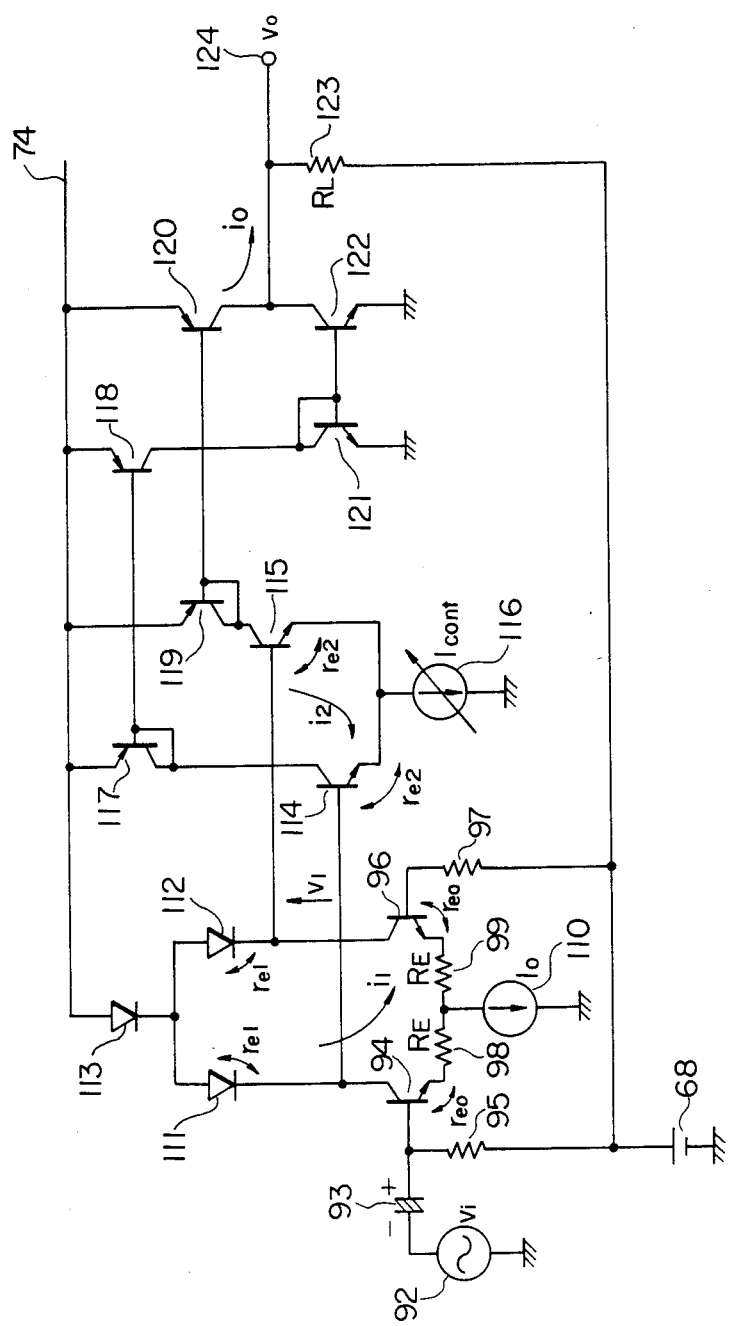
FIG. 10 is a circuit diagram of a circuit arrangement for implementation of a current controlled type amplifier (CCA) used in the embodiment of FIG. 9.

Referring now to FIG. 10 showing an example of the CCA circuit, it will be detailed how the gain of the CCA circuit changes with the control signal $I_{cont}$.

In FIG. 10, a signal source 92 is representative of the output signal of the FM modulation circuit 12 and/or the low-band conversion circuit 15 shown in FIG. 8 or 9. An output terminal 124 of the CCA circuit is adapted to be connected to an input terminal of the mixer circuit 14.

An input signal Vi from the signal source 92 is applied to a base of a transistor 94 via a DC blocking capacitor 93. The base of the transistor 94 is supplied via a bias resistor 95 with a DC bias from the bias voltage source 68 (identical to that of FIG. 9 but illustrated herein for ease of understanding).

The DC bias is also applied via a bias resistor 97 to a base of a transistor 96 which constitutes together with the transistor 94 a first stage of a differential amplifier. Emitters of the transistors 94 and 96 are mutually connected via resistors 98 and 99 each having a resistance of $R_E$. A constant current of $I_o$ is caused by a constant current source 110 to flow between a junction of the resistors 98 and 99 and ground.

Collectors of the transistors 94 and 96 are respectively connected to cathodes of diodes 111 and 112 in order that operating resistances of these diodes are used as loads on the transistors 94 and 96. Anodes of the diodes 111 and 112 are connected in common to a cathode of a diode 113 adapted for DC voltage shifting. The diode 113 has its anode connected to the power supply line 74.

The collectors of the transistors 94 and 96 are also connected to the bases of transistors 114 and 115, respectively, which constitutes a second stage of differential amplifier. Emitters of the transistors 114 and 115 are connected in common to a variable constant current source 116. By controlling a constant current $I_{cont}$ of the constant current source 116, the gain of the CCA circuit can be changed.

The transistor 114 has its collector connected to the collector and base of a transistor 117. The base of the transistor 117 is connected to a base of a transistor 118 to constitute a current mirror circuit.

The transistor 115 has its collector connected to the collector and base of a transistor 119. The base of the transistor 119 is connected to a base of a transistor 120 to constitute a current mirror circuit. The signal Vi is derived from the transistors 118 and 120 as changes in collector currents of the transistors 118 and 120.

Transistors 121 and 122 have their bases mutually connected to form a current mirror circuit. The transistor 121 has its collector connected to a collector of the transistor 118 and the transistor 122 has its collector connected to a collector of the transistor 120.

The collectors of the transistors 120 and 122 are connected in common to a load resistor 123 with a resistance of $R_L$ connected to the bias voltage source 68. An output signal current $i_o$ flows through the load resistor 123 and is converted into an output signal voltage $V_o$.

In operation, it is assumed for instance that a positive voltage is applied to the base of the transistor 94 at an instant when a positive half cycle of the input signal $V_i$ is occurring. The operation under the application of a negative voltage is similar and will not be described herein. Thus, under the application of the positive voltage, base current of the transistor 94 increases so that the transistor 94 is rendered conductive more deeply than before. As a result, the collector current of the transistor 94 is increased to raise a voltage drop due to an operating resistance $r_{e1}$ of the diode 111 and hence the collector voltage of the transistor 94 is reduced. Since the constant current source 110 supplies the constant current, the increased collector current of the transistor 94 results in a decrease in collector current of the transistor 96, followed by an increase in collector voltage of the transistor 96. Consequently, the collector current of the transistor 114 having the base at the same potential as that at the collector of the transistor 94 is decreased while collector current of the transistor 115 having the base at the same potential as that at the collector of the transistor 96 is increased. In this manner, under the application of the invariable constant current from the constant current source 116, a decrease in the collector current of the transistor 114 results in an increase in the collector current of the transistor 115, giving rise to the increased collector current of the transistor 115.

On the other hand, since the collector current of the transistor 114 is identical to the emitter current of the transistor 117 and the transistors 117 and 118 form the current mirror circuit, the collector currents of the transistors 114 and 118 are equal to each other. Since the collector current of the transistor 115 is identical to the emitter current of the transistor 119 and the transistors 119 and 120 form the current mirror circuit, the collector currents of the transistors 115 and 120 are equal to each other. Further the transistors 121 and 122 forming the current mirror circuit have the same collector current and the collector current of the transistor 121 is identical to the collector current of the transistor 118. For these reasons, the collector current of the transistor 122 eventually becomes equal to the collector current of the transistor 114.

With the transistors 114, 115 and 117 to 122 connected as above, as the collector current of the transistor 114 decreases while the collector current of the transistor 115 increases, the collector current of the transistor 120 is increased while the collector current of the transistor 122 is decreased. The difference between the collector currents of the transistors 120 and 122 is given as an output current $i_o$ which flows through the load resistor 123, generating an output voltage $v_o$. It will be appreciated from the foregoing description that the transistor 120 acts to supply the output current $i_o$ to the load resistor 123 and the transistor 122 acts to draw the output current $i_o$.

The CCA circuit configured as above has an input/output gain as will be calculated below. It is assumed that the transistors 94 and 96 each have an emitter operating resistance $r_{e0}$, the diodes 111 and 112 each have an operating resistance $r_{e1}$, and the transistors 114 and 115 each have an emitter operating resistance $r_{e2}$.

Then, the current $i_1$ flowing through the transistors 94 and 96 of the first-stage differential amplifier is indicated by, $$i_1 = \frac{V_i}{2 \times (r_{e0} + R_E)} = \frac{V_i}{2 \times \left(\frac{2A}{I_o} + R_e\right)} \quad (2)$$

where $A = (kT/q) = 26$ mV, k: Boltmann's constant $(8.6 \times 10^{-5}$ eV/K), T: absolute temperature, q: amount of electric charge.

Accordingly, an output voltage $v_1$ of the first-stage differential amplifier is $$v_1 = \frac{v_i}{2 \times \left(\frac{2A}{I_o} + R_E\right)} \times \frac{2A}{I_o} = \frac{\frac{2A}{I_o}}{\frac{2A}{I_o} + R_E} \times v_i. \quad (3)$$

Current $i_2$ flowing through the transistors 114 and 115 of the second-stage differential amplifier is indicated by, $$i_2 = \frac{v_1}{2 \times r_{e2}} = \frac{\frac{2A}{I_o}}{\frac{2A}{I_o} + R_E} \times \frac{1}{2 \times \frac{2A}{I_{cont}}} \times v_i. \quad (4)$$

Accordingly, the output current $i_o$ becomes $$i_o = 2i_2 = \frac{1}{\frac{2A}{I_o} + R_E} \times \frac{I_{cont}}{I_o} \times v_i \quad (5)$$

and the output voltage $v_o$ becomes $$v_o = i_o \times R_L = \left(\frac{1}{\frac{2A}{I_o} + R_E} \times \frac{I_{cont}}{I_o} \times R_L\right) \times v_i. \quad (6)$$

Therefore, the circuit (input/output) gain G of the CCA circuit is given by, $$G = \frac{v_o}{v_i} = \frac{1}{\frac{2A}{I_o} + R_E} \times \frac{I_{cont}}{I_o} \times R_L. \quad (7)$$

In equation (6), $(2A/I_o)$, $R_E$, $I_o$ and $R_L$ are fixed and there results $$G = K \times I_{cont} \quad (8)$$

where $$K = \frac{1}{\frac{2A}{I_o} + R_E} \times \frac{R_L}{I_o},$$

indicating that the input/output gain G of the CCA circuit changes in proportion to the control signal $I_{cont}$.

In the above video signal, magnetic recording apparatus comprised of the control system and the CCA circuits, if, for example, the impedance of the magnetic head 18 is larger with the recording current decreased, then the detection voltage from the resistor 19 will be decreased and the output of the rectifier circuit 60 will be decreased. This output of the rectifier circuit 60 is compared at the comparator circuit 61 with the reference voltage of reference voltage source 62 corresponding to the predetermined recording current. When the output voltage of the rectifier circuit 60 is below the reference voltage, the output voltage of the comparator circuit 61 is raised to increase the control current for the CCA circuits 55 and 56. As a result, the circuit (input/output) gain of the CCA circuits 55 and 56 is raised to increase the output signal level of the CCA circuits 55 and 56, thereby increasing the recording current to the predetermined constant value.

Conversely, if the impedance of the magnetic head 18 is smaller with the recording current increased, then the detection voltage from the resistor 19 will be increased and the output of the rectifier circuit 60 will be increased. This output of the rectifier circuit 60 exceeds the reference voltage of the reference voltage source 62 and hence the output voltage of the comparator circuit 61 is decreased to reduce the control current for the CCA circuits 55 and 56. As a result, the circuit gain of the CCA circuits 55 and 56 is decreased to reduce the output signal level of the CCA circuits 55 and 56, thereby decreasing the recording current to the predetermined constant value.

The above control operation has been described by taking changes in the impedance of the magnetic head, a similar operation may be effectuated where the recording current changes with changes in the gain of the recording amplifier 17 and changes in other circuit constants.

As will be seen from equation (7) indicative of the circuit gain of the CCA circuit, a desired level difference between the luminance and chroma signals of the recording current can be provided readily by selecting, at an initial circuit design phase, either the constant current $I_o$ of the initial-stage differential amplifier or the load resistance $R_L$ of the CCA circuits so as to provide a desired gain difference.

Figure 11:
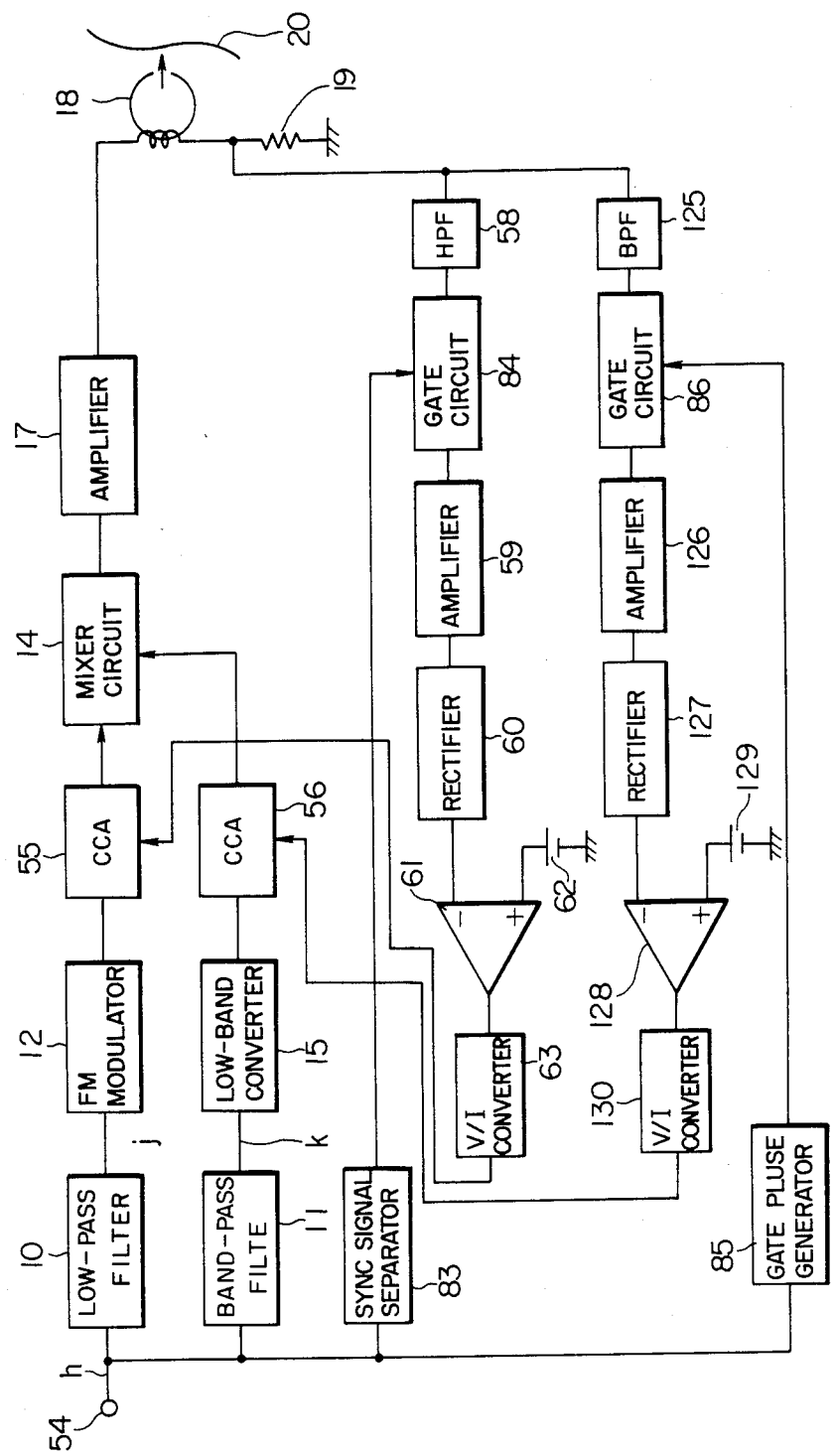
FIG. 11 is a block diagram showing another embodiment of a magnetic recording apparatus for a video signal according to the invention.

FIG. 11 shows, in block form, another embodiment in which the invention is applied to a video signal, magnetic recording apparatus. In contrast to the FIG. 8 embodiment wherein the recording signal, including the luminance and chroma signals, is controlled by using only the sync signal for the luminance signal, the FIG. 11 embodiment contemplates control of the chroma signal of the recording current by detecting a burst signal of the chroma signal.

A voltage developing across the resistor 19 is applied to a HPF 58 and a BPF 125 for detection of a chroma signal. An output signal of the BPF 125 is fed to a second gate circuit 86. The gate circuit 86 is controllable by an output of a gate pulse generator 85 which is supplied with a video signal h. The gate pulse generator 85 comprises a monostable multivibrator which is triggered by a burst signal contained in the video signal. The monostable multivibrator is so set as to produce a high level output signal over a time interval corresponding to a period of the burst signal contained in the video signal, and during the time interval, the gate circuit 86 is enabled to pass therethrough the signal inputted thereto.

The gate circuit 86 is therefore adapted for extraction of the burst signal from the chroma signal of the recording signal flowing through the magnetic head 18. The output signal of the gate circuit 86 is amplified by an amplifier circuit 126, rectified and smoothed by a rectifier circuit 127 and then supplied to a comparator 128. The comparator 128 is also supplied from a reference voltage source 129 with a reference voltage corresponding to a predetermined level of the chroma signal of the recording current. In the comparator 128, a rectified and smoothed DC voltage is compared with the reference voltage and a resulting difference voltage is amplified. This difference voltage is converted by a V/I circuit (voltage-to-current converter) 130 into a current which is used as a control signal applied to the CCA circuit 56 adapted for level change of the chroma signal so as to control the chroma signal of the recording current. Obviously, the chroma signal control section can be implemented by using circuits similar to those of the luminance signal control section 57.

According to the embodiments described thus far with reference to FIGS. 8 to 11, it is necessary to provide the variable resistors for adjustment of the luminance and chroma signals of the recording current in the recording circuit of the magnetic recording and reproducing apparatus, thereby eliminating steps for adjustment of the recording current.

Figure 12:
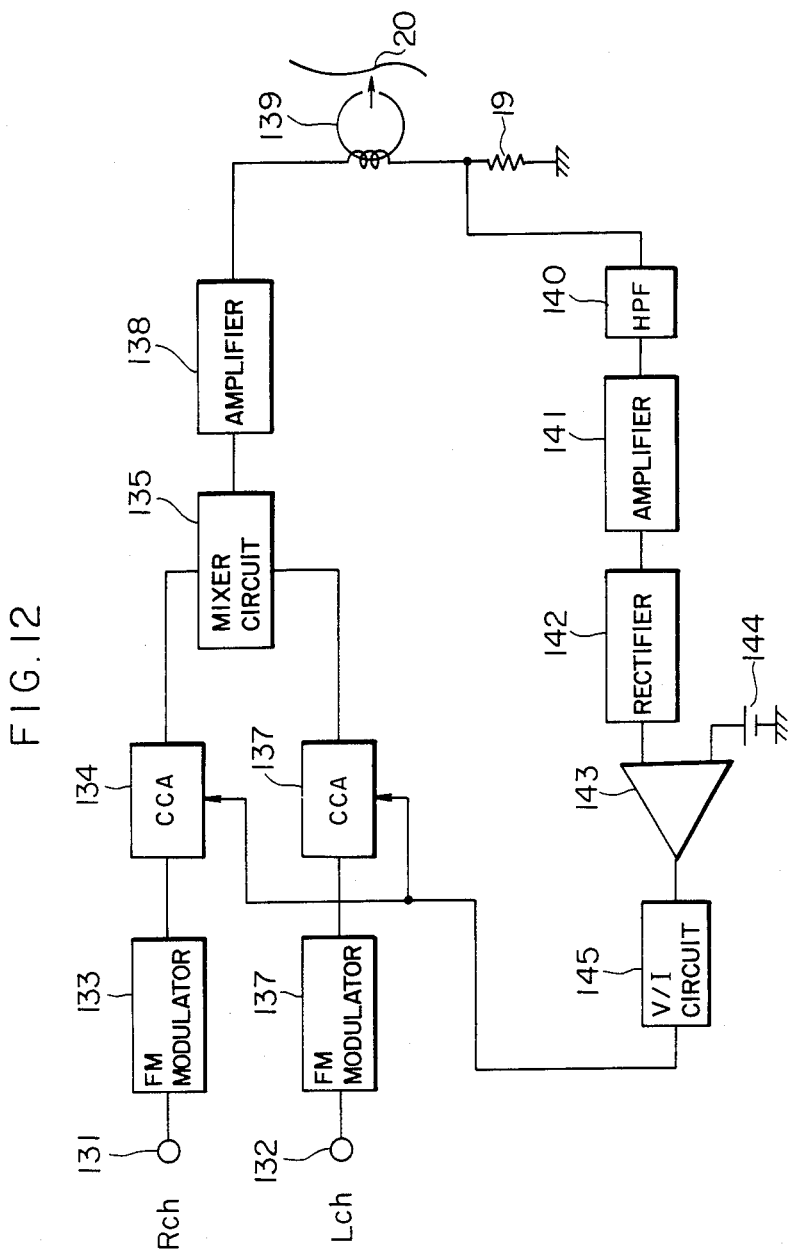
FIG. 12 is a block diagram showing an embodiment in which the invention is applied to a FM modulation magnetic recording apparatus for a voice signal.

FIG. 12 shows, in block form, a further embodiment in which the invention is applied to a recording circuit of an apparatus for recording and reproducing frequency modulated voice signals. In FIG. 12, it is assumed that an input terminal 131 is for a voice AM signal of right channel (hereinafter referred to as Rch) and an input terminal 132 is for a voice AM signal of left channel (hereinafter referred to as Lch). An input signal received by the input terminal 131 is FM modulated by an FM modulator 133, amplified by a CCA circuit 134 to a level designated by an output of a voltage-to-current converter 145 and then supplied to a mixer circuit 135. An input signal received by the input terminal 132, on the other hand, is FM modulated by an FM modulator 136, amplified by a CCA circuit 137 to the level designated by the output of the voltage-to-current converter 145 and then supplied to the mixer circuit 135. An output signal of the mixer circuit 135 is supplied via a recording signal amplifier circuit 138 to a magnetic head 139 for recording of voice signals and recorded on a magnetic tape 20.

A recording current flowing through the magnetic head 139 is detected by a resistor 19, and a detection signal is passed through a HPF 140 (LPF may be substituted for the HPF depending on which of Rch or Lch of the voice carrier frequency is extracted) so that a predetermined channel signal is extracted from the detection signal. The extracted channel signal is amplified by an amplifier circuit 141, rectified and smoothed by a rectifier circuit 142 so as to be converted into a DC voltage which in turn is compared at a comparator 143 with a reference voltage of a reference voltage source 144. The reference voltage corresponds to a desired recording current. A resulting difference voltage is amplified in the comparator and converted by a voltage-to-current converter 145 into a current which is used to control the CCA circuits 134 and 137. Thus, the level of the FM modulated signal, like the video signal of the recording current, is controlled so as to keep constant the recording current of the magnetic head 139.

What is claimed is:

1. A magnetic recording apparatus for recording information on a recording medium through a magnetic head comprising:
   recording signal processing means electrically connected to said magnetic head for receiving an input signal representative of said information, and for processing the received input signal so as to generate a recording signal to be supplied to said magnetic head, said recording signal processing means including:
   a terminal for receiving an input video signal representative of said video information,
   luminance signal extraction means, connected to said terminal, for extracting a luminance signal from said input video signal,
   FM modulation means, connected to the output of said luminance signal extraction means, for FM modulating said luminance signal,
   chroma signal extraction means connected to said terminal, for extracting a chroma signal from said input video signal,
   low-band conversion means for low-band conversion of said chroma signal, and
   mixer means, connected to the outputs of said FM modulation means and low-band conversion means, for mixing an FM modulated luminance signal and a low-band converted chroma signal;
   detection means connected to said magnetic head for detecting said recording signal passed through said magnetic head and for generating a detection signal representative of said recording signal;
   control signal generation means connected to said detection means and being responsive to said detection signal, for generating a control signal, said control signal generation means including:

detection signal conversion means for converting said detection signal into a smoothed DC signal, comparison means for comparing said smoothed DC signal with a predetermined reference signal and generating said control signal on the basis of a difference between said smoothed DC signal and said predetermined reference signal, and sync signal extraction means, connected between the output of said detection means and the input of said detection signal conversion means, for extracting said sync signal from a luminance signal component contained in said detection signal;

control means connected to said recording signal processing means and being responsive to said control signal, for controlling said recording signal processing means so as to set the level of said recording signal passed through said magnetic head to a predetermined optimum value, said control means including:

first variable gain amplifying means connected between said FM modulation means and said mixer means for amplifying, by a variable gain, said FM modulated luminance signal, second variable gain amplifying means, connected between said low-band conversion means and said mixer means, for amplifying, by a variable gain, said low-band converted chroma signal, at least one of said first and second variable gain amplifying means being connected to said control signal so as to control the gain of said at least one of said first and second variable gain amplifying means, said at least one of said first and second variable gain amplifying means being gain controlled its gain by said control signal on the basis of a sync signal.

2. A magnetic recording apparatus according to claim 1, wherein said sync signal extraction means comprises:

filter means, connected to the output of said detection means, for passing said luminance signal component contained in said detection signal;

separation means, connected to said terminal, for separating the sync signal contained in said input video signal; and gate means, controlled by an output signal of said separation means, for passing said sync signal contained in said luminance signal component passed through said separation means.

3. A magnetic recording apparatus according to claim 1, wherein said control signal generation means further comprises a voltage-to-current converter means connected to the output of said comparison means, for generating as said control signal a control current which depends on the output voltage signal from said comparison means, and wherein said at least one of said first and second variable gain amplifying means comprises a current controlled type variable gain amplifier controlled by said control current.

4. A magnetic recording apparatus used for recording information on a recording medium through a magnetic head comprising:

recording signals processing means electrically connected to said magnetic head for receiving an input signal representative of said information, and for processing the received input signal so as to generate a recording signal to be supplied to said magnetic head, said recording signal processing means including:

a terminal for receiving an input signal representative of said information, luminance signal extraction means, connected to said terminal, for extracting a luminance signal from said input video signal, FM modulation means, connected to the output of said luminance signal extraction means, for FM modulating said luminance signal, chroma signal extraction means, connected to said terminal, for extracting a chroma signal from said input video signal, low-band conversion means for low-band conversion of said chroma signal, and mixer means, connected to the outputs of said FM modulation means and low-band conversion means, for mixing an FM modulated luminance signal and a low-band converted chroma signal;

detection means connected to said magnetic head for detecting said recording signal passed through said magnetic head and for generating a detection signal representative of said recording signal;

control signal generation means connected to said detection means and being responsive to said detection signal, for generating a control signal to set the level of said recording signal passed through said magnetic head to a predetermined optimum value;

control means connected to said recording signal processing means and being responsive to said control signal, for controlling said recording signal processing means so as to set the level of said recording signal passed through said magnetic head to a predetermined optimum value, said control means including:

first variable gain amplifying means connected between said FM modulation means and said mixer means for amplifying, by a variable gain, said FM modulated luminance signal;

second variable gain amplifying means, connected between said low-band conversion means and said mixer means, for amplifying, by a variable gain, said low-band converted chroma signal;

wherein said control signal generation means includes:

first control signal generation means for generating, on the basis of the sync signal contained in said detection signal, a first control signal which controls the gain of said first variable gain amplifying means; and second control signal generation means for generating, on the basis of a burst signal contained in said detection signal, a second control signal which controls the gain of said second variable gain amplifying means.

5. A magnetic recording apparatus according to claim 4, wherein said first control signal generation means comprises:

sync signal generation means, connected to the output of said detection means, for extracting said sync signal from a luminance signal component contained in said detection signal;

first detection signal converter means for converting said sync into a smoothed first DC voltage; and first comparator means for comparing said first DC voltage with a first reference voltage and generating, as said first control signal, a first output signal based on a comparison difference, and wherein said second control signal generation means includes:

burst signal extraction means, connected to said detection means, for extracting said burst signal from a chroma signal component contained in said detection signal, second detection signal converter means for converting said burst signal into a smoothed second DC voltage, and second comparator means for comparing said second DC voltage with a second reference voltage and generating, as said second control signal, a second output signal based on a comparison difference.

6. A magnetic recording apparatus according to claim 5, wherein said sync signal extraction means comprises:

first filter means, connected to the output of said detection means, for passing said luminance signal component contained in said detection signal;

separation means, connected to said terminal, for separating said sync signal contained in said input video signal; and gate means, controlled by an output signal of said separation means, for passing said sync signal contained in said luminance signal component.

7. A magnetic recording apparatus according to claim 5, wherein said burst signal extraction means comprises:

second filter means, connected to said detection means, for passing said chroma signal component contained in said detection signal;

pulse generation means, connected to said terminal, for generating a pulse synchronous with the burst signal contained in said input video signal and having a pulse width which is substantially equal to a width of said burst signal; and second gate means, connected between the output of said second filter means and said second detection signal converter means and controlled by said pulse, for transmitting said burst signal contained in said chroma signal component to said second detection signal converter means.

8. A magnetic recording apparatus according to claim 7, wherein said pulse generator means comprises a monostable multivibrator.

9. A magnetic recording apparatus according to claim 5, wherein said first control signal generation means further includes:

first voltage-to-current converter means, connected to the output of said first comparator means, for converting said first output signal into a first current of a value which depends on a voltage value of said first output signal and delivering, as said first control signal, said first current, and said second control signal generation means further includes:

second voltage-to-current converter means, connected to the output of said second comparator means, for converting said second output signal into a second current of a value which depends on a voltage value of said second output signal and delivering, as said second control signal, said second current, and said first and second variable gain amplifying means are of a current controlled type, and their gains are respectively controlled by said first and second currents.

10. A magnetic recording apparatus according to claim 6, wherein said first filter means comprises a high-pass filter.

11. A magnetic recording apparatus according to claim 7, wherein said second filter means comprises a band-pass filter.

12. A magnetic recording apparatus for recording information including independent first voice information and second voice information on a recording medium through a magnetic head, said apparatus comprising:

recording signal processing means electrically connected to said magnetic head for receiving an input signal representative of said information, and for processing the received input signal so as to generate a recording signal to be supplied to said magnetic head, said recording signal processing means including:

a first terminal for receiving a first input voice signal representative of said first voice information, a second terminal for receiving a second input voice signal representative of said second voice information, first FM modulation means, connected to said first terminal, for FM modulating said first input voice signal, second FM modulation means, connected to said second terminal, for FM modulating said second input voice signal, and mixer means for mixing first and second FM modulation voice signals and supplying, as said recording signal, a mixed signal to said magnetic head;

detection means connected to said magnetic head for detecting said recording signal passed through said magnetic head and for generating a detection signal representative of said recording signal;

control signal generation means connected to said detection means and being responsive to said detection signal, for generating a control signal to set the level of said recording signal passed through said magnetic head to a predetermined optical value, said control signal generation means including:

detection signal conversion means for converting said detection signal into a smoothed DC signal, comparison means for comparing said smoothed DC signal with a predetermined reference signal and generating said control signal on the basis of a difference between said smoothed DC signal and said predetermined reference signal, and filter means, connected to said detection means, for selecting from said detection signal a carrier signal of said first or second voice signal;

control means connected to said recording signal processing means and being responsive to said control signal for controlling said recording signal processing means so as to set the level of said recording signal passed through said magnetic head to a predetermined optimum value, said control means including:

first variable gain amplifying means, connected between said first FM modulation means and said mixer means, for amplifying, by a variable gain, said FM modulated first luminance signal, and second variable gain amplifying means, connected between said second FM modulation means and said mixer means, for amplifying, by a variable gain, said FM modulated second luminance signal, wherein the gains of said first and second variable gain amplifying means are controlled by said control signal on the basis of said selected carrier signal.

13. A magnetic recording apparatus according to claim 12, wherein said control signal generation means comprises:

detection signal conversion means for converting said selected carrier signal into a smoothed DC voltage, and comparison means for comparing said smoothed DC voltage with a predetermined reference voltage and producing said control signal on the basis of a comparison difference.

14. A magnetic recording apparatus according to claim 13, wherein said control conversion means comprises amplifier means for amplifying said detection signal, and means for rectifying and smoothing the output of said amplifier means.

15. A magnetic recording apparatus according to claim 13, wherein said control signal generation means further includes voltage-to-current conversion means, connected to the output of said comparator means, for generating, as said control signal, a current which depends on a voltage value of the output signal of said comparator means, and said first and second variable gain amplifying means comprise current controlled type variable gain amplifiers controlled by said control signal.

* * * * *